United States Patent
Dhume

(10) Patent No.: US 9,703,900 B1
(45) Date of Patent: Jul. 11, 2017

(54) SYSTEM LEVEL SIMULATION WRAPPER FOR HYBRID SIMULATION

(71) Applicant: Xilinx, Inc., San Jose, CA (US)

(72) Inventor: Nikhil A. Dhume, Hyderabad (IN)

(73) Assignee: XILINX, INC., San Jose, CA (US)

( * ) Notice: Subject to any disclaimer, the term of this patent is extended or adjusted under 35 U.S.C. 154(b) by 527 days.

(21) Appl. No.: 13/944,820

(22) Filed: Jul. 17, 2013

(51) Int. Cl.
G06F 17/50 (2006.01)

(52) U.S. Cl.
CPC ...... G06F 17/5009 (2013.01); G06F 17/5022 (2013.01)

(58) Field of Classification Search
CPC .......................... G06F 17/5022; G06F 17/5009
USPC .................................................. 716/106, 138
See application file for complete search history.

(56) References Cited

U.S. PATENT DOCUMENTS

| | | | | |
|---|---|---|---|---|
| 6,279,146 B1* | 8/2001 | Evans | ............... | G06F 17/5027 703/14 |
| 6,856,950 B1* | 2/2005 | Abts | ............... | G06F 17/5022 703/13 |
| 7,284,225 B1* | 10/2007 | Ballagh | ............... | G06F 17/5054 710/12 |
| 7,433,813 B1* | 10/2008 | Ballagh | ............... | G06F 17/5022 326/39 |
| 8,145,466 B1 | 3/2012 | Chan et al. | | |
| 8,205,174 B2* | 6/2012 | Li | ............... | G06F 17/5022 716/100 |
| 8,397,188 B1* | 3/2013 | Scheidt | ............... | G06F 17/5022 703/16 |
| 2005/0229170 A1* | 10/2005 | Bellantoni | ............... | G06F 17/5022 717/165 |
| 2006/0282233 A1* | 12/2006 | Pasricha | ............... | G06F 17/5022 703/1 |
| 2010/0198574 A1* | 8/2010 | Veller | ............... | G06F 17/5022 703/14 |

OTHER PUBLICATIONS

Pasricha et al., "Extending the Transaction Level Modeling Approach for Fast Communication Architecture Exploration", 9.2, DAC'04, Jun. 7-11, 2004, pp. 113-118, San Diego, CA US.
Pasricha S. and Dutt, N., "On-Chip Communication Architectures" "System on Chip Interconnect" Chapter 4 Models for Performance Exploration, Section 4.2 Dynamic (Simulation-Based) Performance Estimation Models, pp. 113-116, 2008, Morgan Kaufmann Publishers, MA, US.

\* cited by examiner

Primary Examiner — Stacy Whitmore
(74) Attorney, Agent, or Firm — Gerald Chan; Carleton Clauss; Keith Taboada

(57) ABSTRACT

A system level simulation wrapper includes a plurality of port interfaces configured to provide pin accurate and bus cycle accurate communication. The system also includes a switch coupled to the plurality of port interfaces. The switch is selectively configured to communicate with a Cycle Accurate hardware description language (HDL) model of an intellectual property (IP) block or a system level model of the IP block.

20 Claims, 6 Drawing Sheets

SYSTEM LEVEL SIMULATION WRAPPER FOR HYBRID SIMULATION

FIELD

An embodiment described herein relates generally to simulation of system designs, and in particular to a system level simulation wrapper for hybrid simulation of system designs.

BACKGROUND

System Designs for semiconductor devices such as ASICs or FPGAs, incorporate several different intellectual property (IP) blocks into a single design. IP blocks are individual functional IC components that may be reused from one system design to another. Each IP block may have its own functionality and characteristics independent of other IP blocks in the system design. A bus may be used to provide an interface for connecting several different IP blocks in a given system design. In order to ensure that the IP blocks are properly communicating amongst each other, the bus provides a set of protocols which each IP block must adhere to when communicating with the bus. The system design thus includes IP cores and communication architecture (e.g., bus).

Simulation of a system design may be used to test different characteristics of the system design prior to deployment. This may be done by providing a model for each IP block and simulating the entire system design using the individual IP block models. In order to ensure that the simulation of the system design is accurate, the model for each IP block must be pin-accurate and bus-cycle accurate. Pin-accurate refers to the model being able to characterize data flow down to the granularity of individual pins. Bus cycle accurate refers to the model being able to represent cycle accuracy correctly for transaction communication on the bus interface in accordance with the protocols provided by the bus. A pin-accurate and bus-cycle accurate model can replace a cycle accurate model without affecting functional correctness of IP core and communication architecture simulation while maintaining acceptable variations in timing characteristics.

SUMMARY

A system level simulation wrapper includes: a plurality of port interfaces configured to provide pin accurate and bus cycle accurate communication; and a switch coupled to the plurality of port interfaces, wherein the switch is selectively configured to communicate with a Cycle Accurate HDL model of an intellectual property (IP) block or a system level model of the IP block.

Optionally, the system level simulation wrapper further includes one or more translation layers coupled between the switch and the system level model of the IP block, for translating information between the plurality of port interfaces and the system level model of the IP block.

Optionally, the system level model of the IP block comprises a functional model with a functional interface.

Optionally, the one or more translation layers comprise: a system level interface layer for communication with the plurality of port interfaces; an intermediate level interface layer for communication with the system level interface layer; a pin accurate interface layer for communication with the intermediate level interface layer; and a transaction level modeling (TLM) interface layer for communication with the pin accurate interface layer, wherein the TLM interface layer is configured to receive information from and transmit information to the functional interface of the functional model.

Optionally, the system level model of the IP block comprises a transaction level model with a transaction level model port interface.

Optionally, the one or more translation layers comprise: a system level interface layer for communication with the plurality of port interfaces; an intermediate level interface layer for communication with the system level interface layer; and a pin accurate interface layer for communication with the intermediate level interface layer, wherein the pin accurate interface layer is configured to receive information from and transmit information to the transaction level model port interface of the transaction level model.

Optionally, the system level model of the IP block comprises a pin accurate model with a pin accurate model port interface.

Optionally, the one or more translation layers comprise: a system level interface layer for communication with the plurality of port interfaces; and an intermediate level interface layer for communication with the system level interface layer, wherein the intermediate level interface layer is configured to receive information from and transmit information to the pin accurate model port interface of the pin accurate model.

Optionally, the system level model or the Cycle Accurate HDL model is for simulating a system design.

Optionally, the Cycle Accurate HDL model or the system level model is configured for simulating the system design at a system level.

A system design includes: a bus; a system level simulation wrapper, comprising: a plurality of port interfaces configured to communicate with the bus; and a switch coupled to the plurality of port interfaces, wherein the switch is selectively configured to communicate with a Cycle Accurate HDL model of an intellectual property (IP) block or a system level model of the IP block; and one or more additional Cycle Accurate HDL models coupled to the bus.

Optionally, the system level simulation wrapper further comprises one or more translation layers coupled between the switch and the system level model of the IP block, for translating information between the plurality of port interfaces and the system level model of the IP block.

Optionally, the system level model of the IP block comprises a functional model with a functional interface.

Optionally, the one or more translation layers comprise: a system level interface layer for communication with the plurality of port interfaces; an intermediate level interface layer for communication with the system level interface layer; a pin accurate interface layer for communication with the intermediate level interface layer; and a transaction level modeling (TLM) interface layer for communication with the pin accurate interface layer, wherein the TLM interface layer is configured to receive information from and transmit information to the functional interface of the functional model.

Optionally, the system level model of the IP block comprises a transaction level model with a transaction level model port interface.

Optionally, the one or more translation layers comprise: a system level interface layer for communication with the plurality of port interfaces; an intermediate level interface layer for communication with the system level interface layer; and a pin accurate interface layer for communication with the intermediate level interface layer, wherein the pin accurate interface layer is configured to receive information from and transmit information to the transaction level model port interface of the transaction level model.

Optionally, the system level model of the IP block comprises a pin accurate model with a pin accurate model port interface.

Optionally, the one or more translation layers comprise: a system level interface layer for communication with the plurality of port interfaces; and an intermediate level interface layer for communication with the system level interface layer, wherein the intermediate level interface layer is configured to receive information from and transmit information to the pin accurate model port interface of the pin accurate model.

Optionally, the Cycle Accurate HDL model or the system level model is for system design simulation.

Optionally, the system level model is configured to communicate with the one or more additional Cycle Accurate HDL models of the IP block.

The above features and other features will be described in the detailed description.

BRIEF DESCRIPTION OF THE DRAWINGS

The drawings illustrate the design and utility of various features described herein, in which similar elements are referred to by common reference numerals. These drawings are not necessarily drawn to scale. In order to better appreciate how the above-recited and other advantages and objects are obtained, a more particular description will be rendered, which are illustrated in the accompanying drawings. These drawings depict only exemplary features and are not therefore to be considered limiting in the scope of the claims.

DETAILED DESCRIPTION

Figure 1:
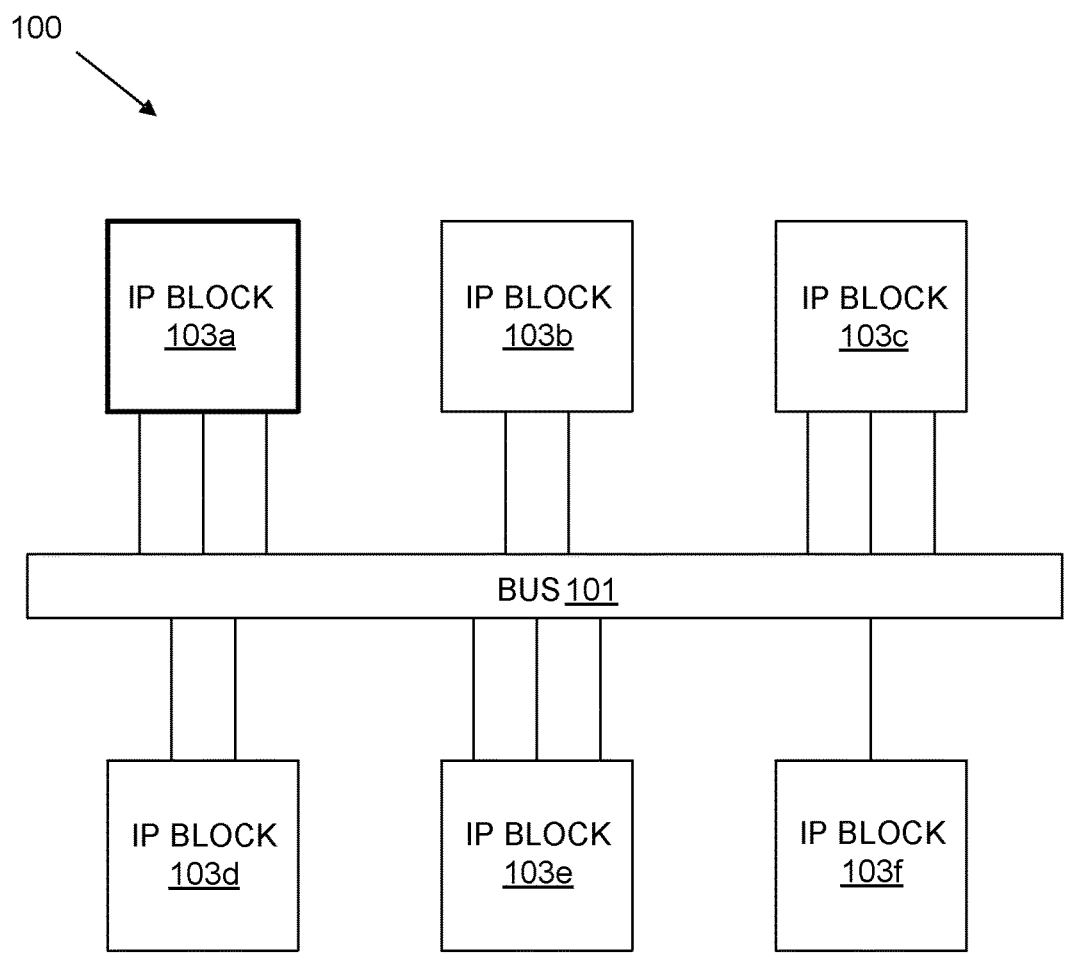
FIG. 1 is a schematic diagram of an exemplary system design.

Various features are described hereinafter with reference to the figures. It should be noted that the figures are not drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described.

System Designs for semiconductor devices such as ASICs or FPGAs, contain several different intellectual property (IP) blocks in a single design. IP blocks are individual functional IC components that may be reused from one system design to another. An IP block may be modeled using Cycle Accurate HDL model or system level model. Cycle Accurate HDL models are cycle accurate models with structural, behavioral or mixed hardware descriptions of an IP block suitable for simulation by HDL simulators. System level models are less-detailed models of an IP block, and pin-accuracy may or may not be present in system level models. System level models may carry interfaces in the form of high level structures such as function based interfaces or bus channel interfaces.

An embodiment described herein provides a simulation wrapper for both Cycle Accurate HDL model and system level model of an IP block for a system design. The simulation wrapper includes a switch that allows for selection of either the Cycle Accurate HDL model or system level model of the IP block for simulating the system design, and provides pin-accurate and bus-cycle accurate communication between the model and a bus of the system design during simulation. Translation layers may be provided by the simulation wrapper for encapsulating the system level model and providing translation of outputs from and inputs to the system level model for communication with the bus.

FIG. 1 is a schematic diagram of an exemplary system design 100. The system design 100 includes several different IP blocks 103a-f connected to each other via a bus 101.

Each IP block from IP blocks 103a-f may have its own functionality and characteristics independent of other IP blocks in the system design. The bus 101 provides an interface for connecting the different IP blocks 103a-f in the system design. In order to ensure that the IP blocks 103a-f are properly communicating amongst each other, the bus 101 provides a set of protocols which each IP block must adhere to when communicating with the bus 101. The system design 100 thus includes IP cores 103a-f and communication architecture (e.g., bus) 101.

Simulation of a system design 100 may be used to test different characteristics of the system design 100 prior to deployment. This may be done by providing a model for each IP block of IP blocks 103a-f and simulating the entire system design 100 using the individual IP block models. In order to ensure that the simulation of the system design is accurate, IP cores and communication architecture is desired to be simulated correctly. The model for each IP block must be pin-accurate and bus-cycle accurate. Pin-accurate refers to the model being able to characterize data/information flow down to the granularity of individual pins. Bus cycle accurate refers to the model being able to represent cycle accuracy correctly for transaction communication on the bus interface in accordance with the protocols of the bus. A pin-accurate and bus-cycle accurate model can replace a cycle accurate HDL model without affecting functional correctness of IP core and communication architecture simulation while maintaining acceptable variations in timing characteristics.

IP blocks 103a-f may be modeled using Cycle Accurate HDL models or system level models. Cycle Accurate HDL models are Cycle Accurate models with structural, behavioral or mixed hardware descriptions of an IP block suitable for simulation by HDL simulators. Cycle Accurate HDL models may be directly connected with bus interfaces in communication architectures.

System level models are less-detailed models (and may be software models) of an IP block. Examples of system level models are functional models, TLM models, SystemC models and Bus-cycle accurate models. System level models may carry interfaces in the form of high level structures such as function based interfaces or bus channel interfaces. Inputs to and outputs from of a system level model may require adaptation to the HDL bus model for interoperability. Depending on the type of system level model provided, pin-accuracy may or may not be present. Bus-cycle accuracy may be provided by way of translation for a system level model. The adaptation technique for a system level model to connect with an HDL bus model is dependent on the type of interface provided by the system level model.

Because system level models are less-detailed, simulation is computationally less expensive compared to Cycle Accurate HDL models. System level models are hence faster and may be preferred when the level of simulation detail is acceptable in a trade off against speed. Some approaches for simulating system designs either require all models of IP blocks of the system design to be of the Cycle Accurate HDL model type, or require the communication and IP cores to have system level models, or provide mechanisms to simulate part of the HDL design with system level design using APIs such as VPI or SystemVerilog DPI. In other words, replacing simulation of Cycle Accurate HDL models of IP cores with system level models requires substantial effort, and does not provide a scalable method to use various system level model implementations in place of cycle accurate HDL models.

In accordance with some embodiments, a mechanism for allowing system designs to be simulated using a hybrid of Cycle Accurate HDL models and system level models is provided. By doing so, a system design can incrementally substitute Cycle Accurate HDL models with system level models of varying degrees of granularity without requiring any additional changes to the system design.

Figure 2:
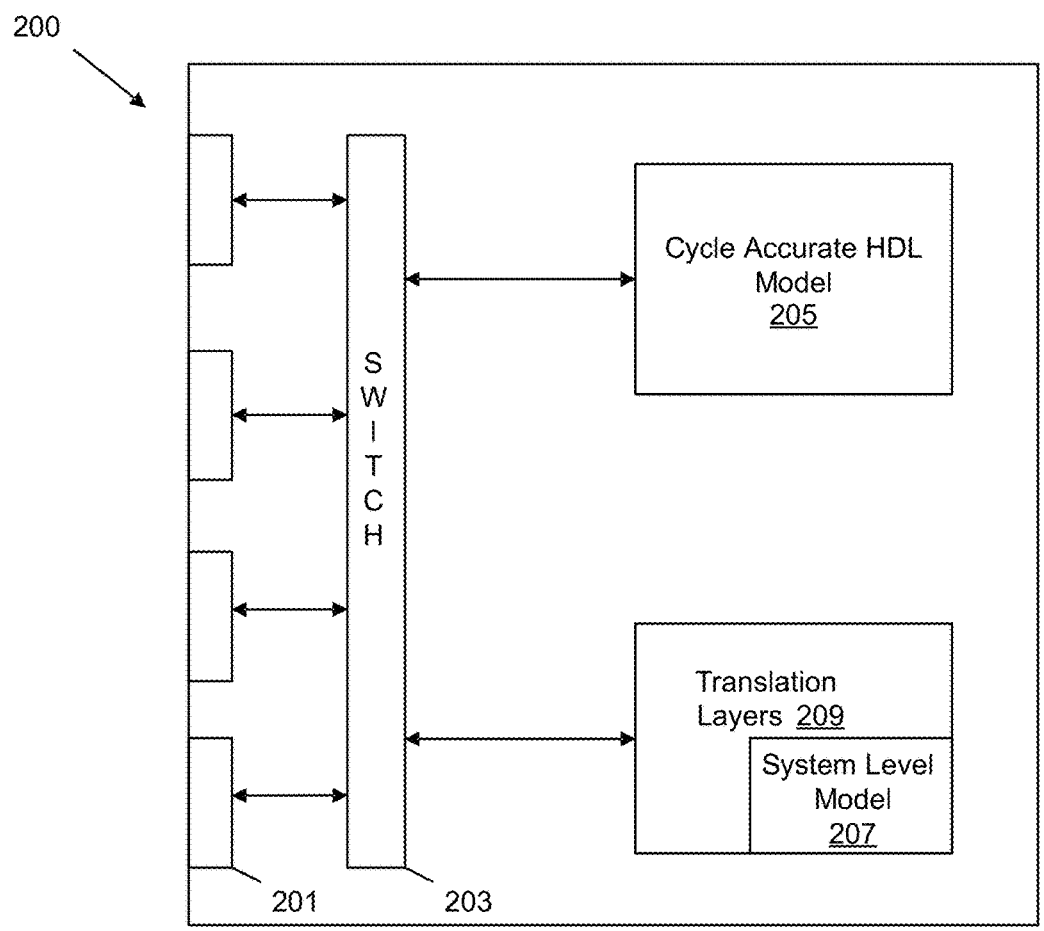
FIG. 2 is a schematic diagram of a system level simulation wrapper according to some embodiments.

FIG. 2 is a schematic diagram of a system level simulation wrapper 200 according to some embodiments. The system level simulation wrapper 200 may include a system level model 207 and a Cycle Accurate HDL model 205 of the same IP block, and provides a pin-accurate and bus-cycle accurate model for the IP block during simulation of the system design. By doing so, regardless of whether the system level model 207 or the Cycle Accurate HDL model 205 is selected to be used for simulation of the system design, pin-accurate and bus-cycle accurate communication with the bus is ensured during simulation.

In some embodiments, the system level model 207 may be a functional model, TLM model, SystemC model, bus-cycle accurate model or System Verilog model.

The system level simulation wrapper 200 also includes a plurality of port interfaces 201 and a switch 203. The plurality of port interfaces 201 are configured to provide pin accurate and bus cycle accurate communication with a corresponding bus. The plurality of port interfaces may be configured to communicate with the bus in accordance with protocols provided by the bus, such that any outputs of the IP block model (either Cycle Accurate HDL model or system level model) provided to the bus are pin accurate and bus cycle accurate with respect to the bus.

The switch is coupled to the plurality of port interfaces 201 and is selectively configured to communicate with the Cycle Accurate HDL model 205 or the system level model 207 of the IP block. When the Cycle Accurate HDL model 205 is selected for system design simulation, the switch is connected to the Cycle Accurate HDL model 205 and not connected to the system level model 207. When the system level model 207 is selected for system design simulation, the switch is connected to the system level model 207 and not connected to the Cycle Accurate HDL model 205.

The selection of the switch 203 may be subjected to limitations of a system level model 207 by automatically detecting parameter configurations which may not be supported by the system level model 207. Such automatic detection may be used to inform a user about the limitation or may be used to switch simulation to the Cycle Accurate HDL model 205 either automatically or with manual intervention of the user.

As mentioned above, Cycle Accurate HDL models 205 are either structural or behavioral descriptions of IP blocks and port interfaces of the Cycle Accurate HDL model 205 may be directly provided to the bus during simulation without adaptation. Thus, when the Cycle Accurate HDL model 205 is selected for system design simulation, the structural or behavioral description of the Cycle Accurate HDL model 205 may be connected through the switch to corresponding port interfaces of the plurality of port interfaces 201 of the system level simulation wrapper 200. Outputs from the Cycle Accurate HDL model 205 may then be provided to the bus through the plurality of port interfaces 201 without performing any translation on the outputs of the Cycle Accurate HDL model 205. Likewise, inputs from the bus may be provided to the Cycle Accurate HDL model 205 through the plurality of port interfaces 201 without performing any translation on the inputs from the bus.

Outputs from and inputs to system level models 207, on the other hand, require various levels of translation during system design simulation. In order to provide this translation, the system-level simulation wrapper 200 may additionally include a set of translation layers 209, which encapsulate the system level model 207 and provide translation of outputs from and inputs to the system level model 207 for communication with the bus. The type and amount of translation layers 209 provided by the system level simulation wrapper 200 are dependent on the type of system level model being used to model the IP block. For example, where the system level model 207 is a pin-accurate model, only an intermediate interface layer and a system level interface layer may be necessary for providing translation. However, where the system level model 207 is merely a functional model, a transaction level modeling (TLM) interface layer, pin accurate interface layer, intermediate interface layer, and system level interface layer may be necessary for providing translation. Additional details regarding translation layers 209 will be provided below.

By providing a system level simulation wrapper 200 to encapsulate a Cycle Accurate HDL model 205 of an IP block or a system level model 207 of an IP block, either the Cycle Accurate HDL model 205 or the system level model 207 may be selected by the switch 203 to be used for system design simulation, regardless of how the other IP blocks in the system design are modeled. Said otherwise, the system level simulation wrapper 200 may be used to provide translation to the system level model 207 such that the system level model 207 may be used in a system design simulation where the other IP blocks in the system design are being modeled using Cycle Accurate HDL models. Additionally, the system level simulation wrapper 200 allows modeling of the IP block to be done with either a Cycle Accurate HDL model or a system level model depending on the particular type of simulation being performed on the system design. The system level simulation wrapper 200 provides for the system design to incrementally substitute Cycle Accurate HDL models of IP blocks with various types of system level models of IP blocks without requiring any changes to other IP block models in the system design. This is because the system design is unaware that a system level model, rather than a Cycle Accurate HDL model, is being used for simulation due to the simulation wrapper's ability to encapsulate the system level model and translate its output to the bus and input from the bus.

Figure 3:
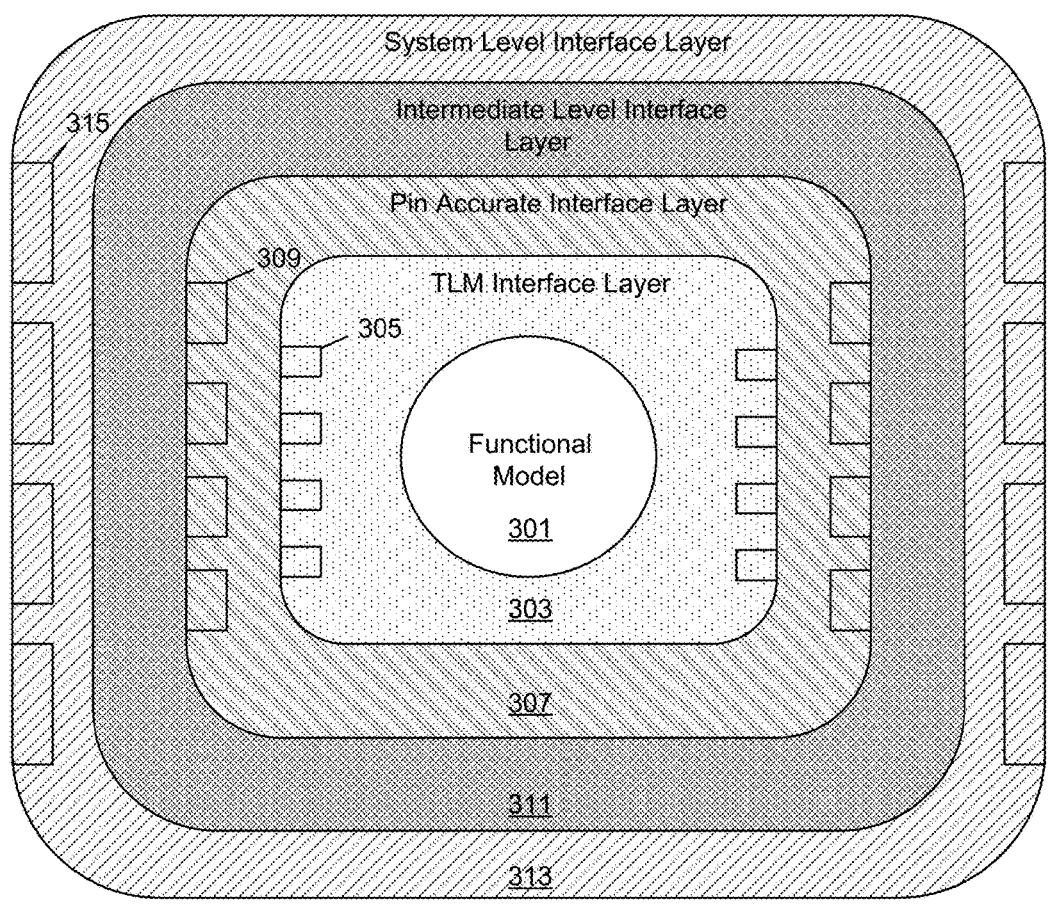
FIG. 3 is a schematic diagram of translation layer for a system level simulation wrapper according to some embodiments.

FIG. 3 is a schematic diagram of a set of translation layers for the system level simulation wrapper 200. A functional model 301 (which may be considered a type of system level model) of an IP block is provided and a set of translation layers 303, 307, 311, 313 are provided for encapsulating the functional model 301. The functional model 301 may be an example of the system level model 207 of FIG. 2. The translation layers 303, 307, 311 and 313 translate the functional model output for the plurality of port interfaces 201 of the simulation wrapper 200, and additionally, translate inputs from the plurality of port interfaces 201 of the simulation wrapper 200 for the functional model 301.

The functional model 301 illustrated in FIG. 3 is a C-model with a functional interface (not shown) rather than port interfaces. As such, any data/information received from the bus at the port interfaces 201 of the simulation wrapper 200 must undergo a series of translations prior to being provided to the functional model 301. Likewise, any data/information output from the functional model 301 must also undergo a series of translations prior to being provided to the port interfaces 201 of the simulation wrapper 200.

The translation layers may include a transaction level modeling (TLM) interface layer 303, a pin accurate interface layer 307, an intermediate level interface layer 311 and a system level interface layer 315. While FIG. 3 depicts this particular set of translation layers, one ordinarily skilled in the art will recognize that various different sets of translation layers may be provided depending on the particular functional model being used.

A description of how data/information received at the simulation wrapper 200 is translated for the functional model 301 will now be discussed. When data/information is received from the bus at the port interfaces 201 of the simulation wrapper 200, the data/information is initially buffered into ports 315 of a system level interface layer 313. The system level interface layer 313 is configured to receive data/information from and transmit data/information to the port interfaces 201 of the simulation wrapper 200. In some embodiments, the system level interface layer 313 may be a System Verilog Module. The system level interface layer 313 is configured to directly communicate with the port interfaces 201 of the simulation wrapper 200, without the need to reconfigure the data/information coming from the port interfaces 201.

The system level interface layer 313 then configures the received data/information for the intermediate level interface layer 311. Upon configuring the received data/information for the intermediate level interface layer 311, the system level interface layer 313 then provides the configured data/information to the intermediate level interface layer 311. In some embodiments, the intermediate level interface layer 311 may be a C++ interface for SystemVerilog. In some embodiments, the intermediate interface layer does not include ports and configuring the data/information at the system level interface layer 313 involves consolidating the data/information in the ports 315 of the system level interface layer 313 into a single buffer prior to being provided to the intermediate level interface layer 311.

Once the data/information is received at the intermediate level interface layer 311, the data/information is configured for the pin accurate interface layer 307. Upon configuring the received data/information for the pin accurate interface layer 307, the intermediate level interface layer 311 then provides the configured data/information to the pin accurate interface layer 307. In some embodiments, the pin accurate interface layer 307 includes a plurality of objects 309 representing ports and as such the data/information at the intermediate level interface layer 311 is configured for such port objects 309 prior to being provided to the pin accurate interface layer 307.

Once the data/information is received at the port objects 309 of the pin accurate interface layer 307, the data/information is configured for the TLM interface layer 303. Upon configuring the received data/information at the port objects 309 of the pin accurate interface layer 307, the pin accurate interface layer 307 then provides the configured data/information to the TLM interface layer 303. In some embodiments, the TLM interface layer 303 includes a plurality of transaction level ports 305 and as such the data/information at the pin accurate interface layer 307 is configured for such transaction level ports 305 prior to being provided to the TLM interface layer 303. In some embodiments, configuring the data/information at the pin accurate interface layer 307 for the transaction level ports 305 of the TLM interface layer 303 may involve sampling values from the port object(s) 309 of the pin accurate interface layer 307.

Once the data/information is received at the transaction level ports 305 of the TLM interface layer 303, the data/information is configured for the functional model 301. Upon configuring the received data/information at the transaction level ports 305 of the TLM interface layer 303, the TLM interface layer 303 then provides the configured data/information to the functional model 301. In some embodiments, the functional model 301 includes a functional interface and as such the data/information at the TLM interface layer 303 is configured for such a functional interface prior to being provided to the functional model 301. In some embodiments, configuring the data/information at the TLM interface layer 303 for the functional interface of the functional model 301 may involve translating data/information at the transaction level ports 305 of the TLM interface layer 303 into payload data/information for the functional model 301.

A description of how data/information output by the functional model 301 is translated for the port interfaces 201 of the simulation wrapper 200 will now be discussed. When data/information is output from the functional model 301, the data/information is in the form of payload data/information. The TLM interface layer 303 receives the data/information from the functional model 301 and configures the received data/information for the pin accurate interface layer 307. Upon configuring the received data/information for the pin accurate interface layer 307, the TLM interface layer 303 then provides the configured data/information to the pin accurate interface layer 307. In some embodiments, the TLM interface layer 303 includes a plurality of transaction level ports 305 and as such the data/information received from the functional model 301 is configured for such transaction level ports 305 prior to being provided to the pin accurate interface layer 307. In some embodiments, configuring the data/information at the TLM interface layer 303 for the pin accurate interface layer 307 may involve translating payload data/information into data/information for the transaction level ports 305 of the TLM interface layer 303.

The pin accurate interface layer 307 receives the data/information from the transaction level ports 305 of the TLM interface layer 303 and configures the received data/information for the intermediate interface layer 311. Upon configuring the received data/information for the intermediate interface layer 311, the pin accurate interface layer 307 then provides the configured data/information to the intermediate interface layer 311. In some embodiments, the pin accurate interface layer 307 includes a plurality of port objects 309 and as such the data/information received from the TLM interface layer 303 is configured for such port objects 309 prior to being provided to the intermediate interface layer 311. In some embodiments, configuring the data/information at the pin accurate interface layer 307 for the intermediate interface layer 311 may involve sampling data/information from the transaction level ports 305 of the TLM interface layer 303 for the port objects 309 of the pin accurate interface layer 307.

The intermediate interface layer 311 receives the data/information from the port objects 309 of the pin accurate interface layer 307 and configures the received data/information for the system level interface layer 313. Upon configuring the received data/information for the system level interface layer 313, the intermediate interface layer 311 then provides the configured data/information to the system level interface layer 313. In some embodiments, the intermediate interface layer 311 does not include ports, and configuring the data/information at the intermediate interface layer 313 involves consolidating the data/information in the port objects 309 of the pin accurate interface layer 307 into a single buffer.

The system level interface layer 313 receives the data/information from the intermediate level interface layer 311 and configures the received data/information for the port interfaces 201 of the simulation wrapper 200. Upon configuring the received data/information for the port interfaces 201 of the simulation wrapper 200, the system level interface layer 313 then provides the configured data/information to the port interfaces 201 of the simulation wrapper 200, which then forwards the data/information to the bus in a pin accurate and bus cycle accurate manner. In some embodiments, the system level interface layer 313 includes ports 315 and configuring the data/information at the system level interface layer 313 involves configuring the data/information for the ports 315 of the system level interface layer 313.

Although FIG. 3 has been described with reference to a C-type functional model and four translation layers, it is important to note that any number of translation layers may be provided for various functional model types.

By providing a set of translation layers for a system level model, the outputs from the system level model may be configured to correctly interface with the port interfaces 201 of the simulation wrapper 200, thereby allowing for outputs of the system level model to be simulated for a system design in a bus cycle accurate and pin accurate manner. Likewise, by providing the set of translation layers for the system level model, inputs from the port interfaces 201 of the simulation wrapper 200 may be configured to correctly interface with the interface of the system level model, thereby allowing for inputs to the system level model to be simulated for a system design in a bus cycle accurate and pin accurate manner.

Figure 4:
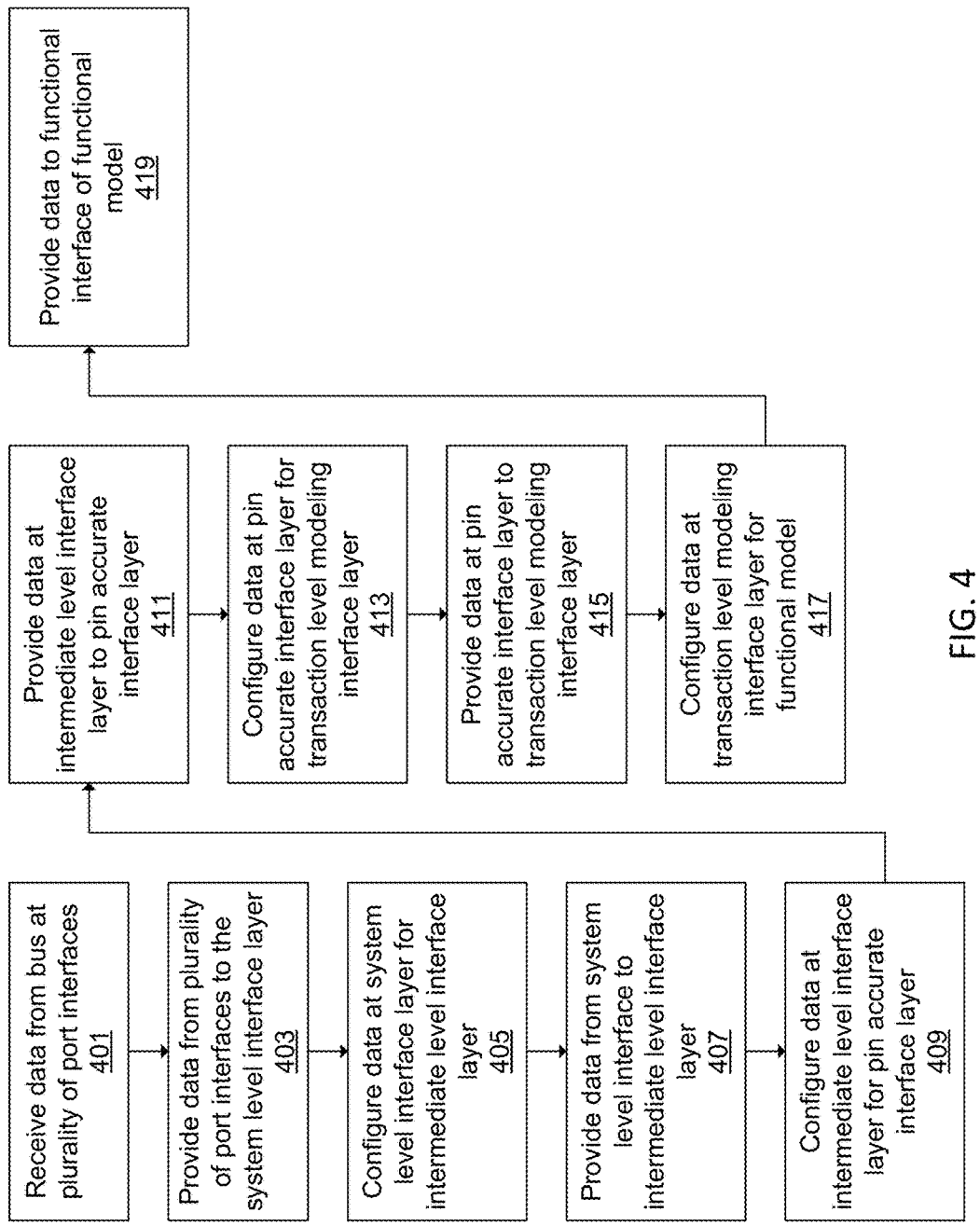
FIG. 4 is a flow diagram illustrating an exemplary method for utilizing the translation layers for providing data from a bus to a functional model through various communication abstraction layers.

FIG. 4 is a flow diagram illustrating an exemplary method for utilizing the translation layers for providing data/information from a bus to a system level model. FIG. 4 will be described with reference to the system level model (e.g., functional model) 301 and translation layers in FIG. 3. However, it is important to note that the method for utilizing translation layers in FIG. 4 may be extended for any system level model type and any number of different translation layers.

Initially data/information is received from the bus at the port interfaces 201 of the simulation wrapper 200 as shown at 401. The data/information received at the plurality of port interfaces 201 is then provided to the system level interface layer as shown at 403. In some embodiments, the data/information provided to the system level interface layer is initially buffered into ports of the system level interface layer. The system level interface layer is configured to receive data/information from and transmit data/information to the port interfaces 201 of the simulation wrapper 200. In some embodiments, the system level interface layer may be a System Verilog Module. The system level interface layer is configured to directly communicate with the port interfaces 201 of the simulation wrapper 200, without the need to reconfigure the data/information coming from the port interfaces 201.

The system level interface layer then configures the received data/information for the intermediate level interface layer as shown at 405. Upon configuring the received data/information for the intermediate level interface layer, the system level interface layer then provides the configured data/information to the intermediate level interface layer as shown at 407. In some embodiments, the intermediate level interface layer may be a C++ interface for SystemVerilog. In some embodiments, the intermediate interface layer does not include ports and configuring the data/information at the system level interface layer involves consolidating the data/information in the ports of the system level interface layer into a single buffer prior to being provided to the intermediate level interface layer.

Once the data/information is received at the intermediate level interface layer, the data/information is configured for the pin accurate interface layer as shown at 409. Upon configuring the received data/information for the pin accurate interface layer, the intermediate level interface layer then provides the configured data/information to the pin accurate interface layer as shown at 411. In some embodiments, the pin accurate interface layer includes a plurality of objects representing ports and as such the data/information at the intermediate level interface layer is configured for such port objects prior to being provided to the pin accurate interface layer.

Once the data/information is received at the port objects of the pin accurate interface layer, the data/information is configured for the TLM interface layer as shown at 413. Upon configuring the received data/information at the port objects of the pin accurate interface layer, the pin accurate interface layer then provides the configured data/information to the TLM interface layer as shown at 415. In some embodiments, the TLM interface layer includes a plurality of transaction level ports and as such the data/information at the pin accurate interface layer is configured for such transaction level ports prior to being provided to the TLM interface layer. In some embodiments, configuring the data/information at the pin accurate interface layer for the transaction level ports of the TLM interface layer may involve sampling values from the port object(s) of the pin accurate interface layer.

Once the data/information is received at the transaction level ports of the TLM interface layer, the data/information is configured for the functional model 301 as shown at 417. Upon configuring the received data/information at the transaction level ports of the TLM interface layer, the TLM interface layer then provides the configured data/information to the functional model 301 as shown at 419. In some embodiments, the functional model 301 includes a functional interface and as such the data/information at the TLM interface layer is configured for such a functional interface prior to being provided to the functional model 301. In some embodiments, configuring the data/information at the TLM interface layer for the functional interface of the functional model 301 may involve translating information at the transaction level ports of the TLM interface layer into payload data/information for the functional model 301.

Figure 5:
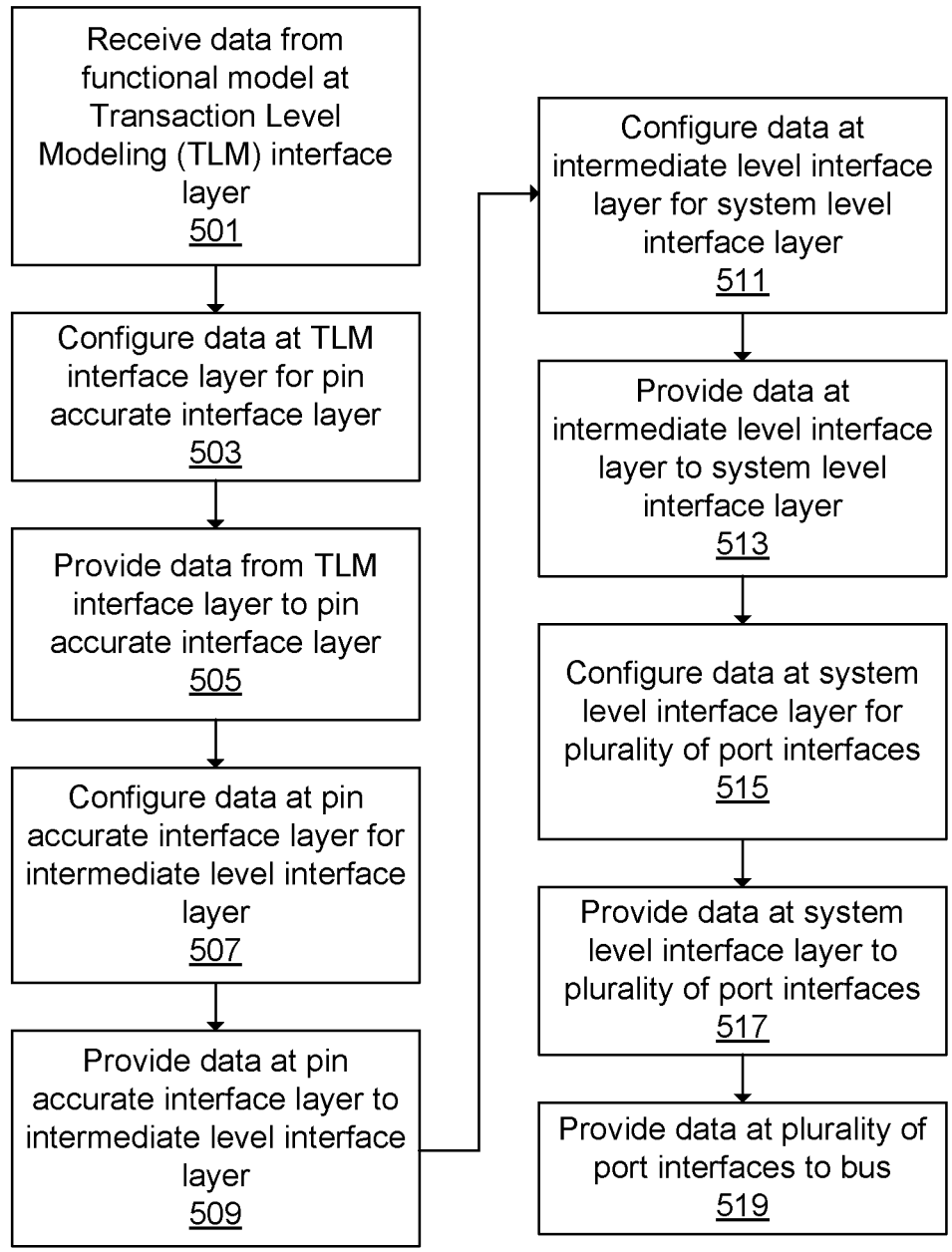
FIG. 5 is a flow diagram illustrating an exemplary method for utilizing the translation layers for providing data from a functional model to a bus.

FIG. 5 is a flow diagram illustrating an exemplary method for utilizing the translation layers for providing data/information from a system level model to a bus. FIG. 5 will be described with reference to the system level model (e.g., functional model) 301 and translation layers in FIG. 3. However, it is important to note that the method for utilizing translation layers in FIG. 5 may be extended for any system level model type and any number of different translation layers.

When data/information is output from the functional model 301, the data/information is in the form of payload data/information. The TLM interface layer receives the data/information from the functional model as shown at 501 and configures the received data/information for the pin accurate interface layer as shown at 503. Upon configuring the received data/information for the pin accurate interface layer, the TLM interface layer then provides the configured data/information to the pin accurate interface layer as shown at 505. In some embodiments, the TLM interface layer includes a plurality of transaction level ports and as such the data/information received from the functional model 301 is configured for such transaction level ports prior to being provided to the pin accurate interface layer. In some embodiments, configuring the data/information at the TLM interface layer for the pin accurate interface layer may involve translating payload data/information into data/information for the transaction level ports of the TLM interface layer.

The pin accurate interface layer receives the data/information from the transaction level ports of the TLM interface layer and configures the received data/information for the intermediate interface layer as shown at 507. Upon configuring the received data/information for the intermediate interface layer, the pin accurate interface layer then provides the configured data/information to the intermediate interface layer as shown at 509. In some embodiments, the pin accurate interface layer includes a plurality of port objects and as such the data/information received from the TLM interface layer is configured for such port objects prior to being provided to the intermediate interface layer. In some embodiments, configuring the data/information at the pin accurate interface layer for the intermediate interface layer may involve sampling data/information from the transaction level ports of the TLM interface layer for the port objects of the pin accurate interface layer.

The intermediate interface layer receives the data/information from the port objects of the pin accurate interface layer and configures the received data/information for the system level interface layer as shown at 511. Upon configuring the received data/information for the system level interface layer, the intermediate interface layer then provides the configured data/information to the system level interface layer as shown at 513. In some embodiments, the intermediate interface layer does not include ports and configuring the data/information at the intermediate interface layer involves consolidating the data/information in the port objects of the pin accurate interface layer into a single buffer.

The system level interface layer receives the data/information from the intermediate level interface layer and configures the received data/information for the port interfaces 201 of the simulation wrapper 200 as shown at 515. Upon configuring the received data/information for the port interfaces 201 of the simulation wrapper 200, the system level interface layer then provides the configured data/information to the port interfaces 201 of the simulation wrapper 200 as shown at 517, which then forwards the data/information to the bus in a pin accurate and bus cycle accurate manner as shown at 519. In some embodiments, the system level interface layer includes ports and configuring the data/information at the system level interface layer involves configuring the data/information for the ports of the system level interface layer.

As mentioned above, by providing a set of translation layers for a system level model (e.g., functional model), the outputs from the system level model may be configured to correctly interface with the port interfaces 201 of the simulation wrapper 200, thereby allowing for outputs of the system level model to be simulated for a system design in a bus cycle accurate and pin accurate manner. Likewise, by providing the set of translation layers for the system level model, inputs from the port interfaces 201 of the simulation wrapper 200 may be configured to correctly interface with the interface of the system level model, thereby allowing for inputs to the system level model to be simulated for a system design in a bus cycle accurate and pin accurate manner.

Figure 6:
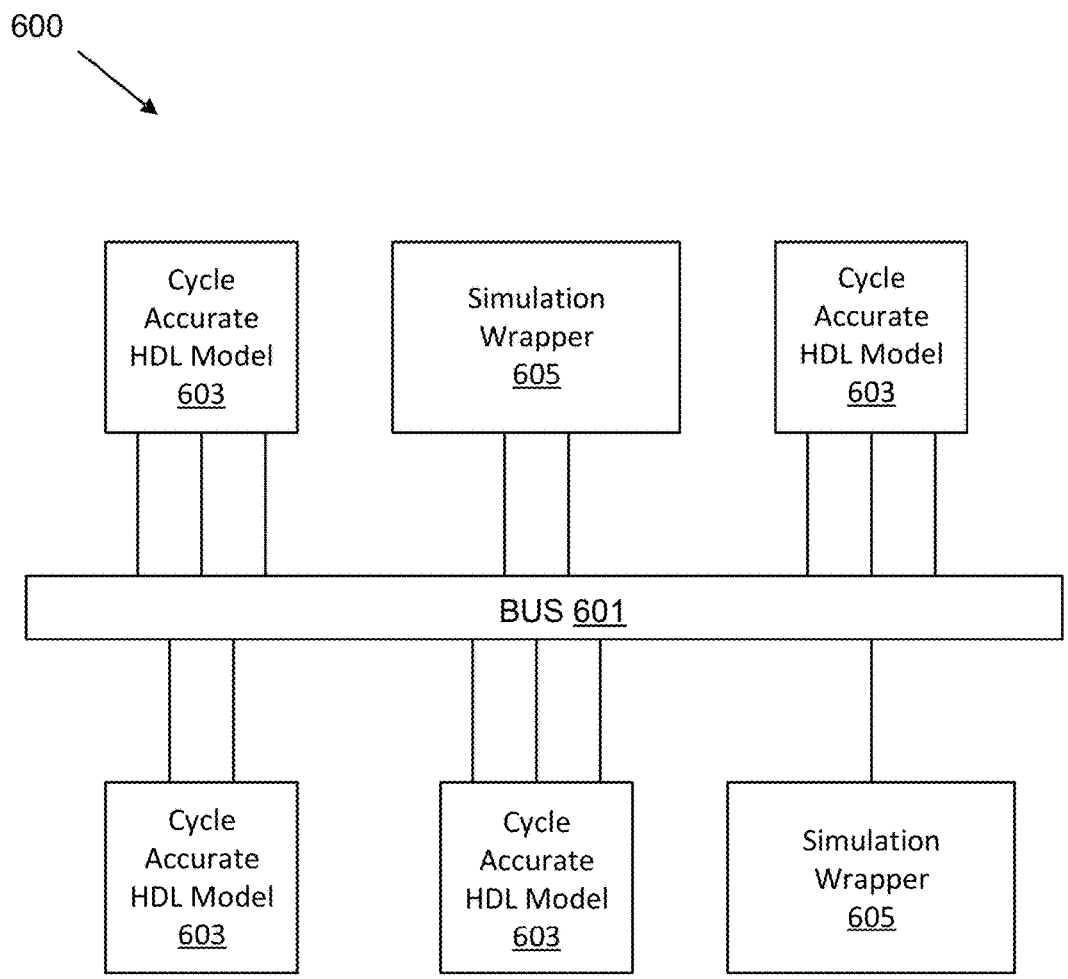
FIG. 6 is a schematic diagram of an exemplary system design that utilizes a system level simulation wrapper.

FIG. 6 is a schematic diagram of an exemplary system design that utilizes a system level simulation wrapper. The system design 600 of FIG. 6 includes Cycle Accurate HDL IP block models 603 and system level simulation wrappers 605 functionally connected to a bus 601. The simulation wrappers 605 behave in the same manner as described above with reference to FIGS. 2-5. Each of the simulation wrappers 605 may be an example of the simulation wrapper 200 in some embodiments.

By utilizing simulation wrappers 605 to encapsulate a Cycle Accurate HDL model of an IP block or a system level model of an IP block, either the Cycle Accurate HDL model or system level model may be selected to be used for system design simulation, regardless of how the other IP blocks in the system design are modeled (e.g., Cycle Accurate HDL IP block models 603). Said otherwise, a system level simulation wrapper 605 may be used to provide translation to a system level model such that the system level model may be used in a system design simulation where the other IP blocks in the system design are being modeled using Cycle Accurate HDL models 603. Additionally, the system level simulation wrapper 605 allows modeling of the IP block to be done with either a Cycle Accurate HDL model or a system level model depending on the particular type of simulation being performed on the system design. The system level simulation wrapper 605 provides for the system design 600 to incrementally substitute Cycle Accurate HDL models of IP blocks with various types of system level models of IP blocks without requiring any changes to other IP block models 603 in the system design. This is because the system design 600 is unaware that a system level model, rather than a Cycle Accurate HDL model, is being used for simulation due to the simulation wrapper's 605 ability to encapsulate the system level model and to translate its output to the bus 601 and input from the bus 601.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed is:

1. A computing system for simulating a design of a hardware system, the computing system comprising:
   a processor; and
   memory storing the design, wherein the design comprises:
      a system level simulation wrapper, comprising:
         a plurality of port interfaces configured to provide pin accurate and bus cycle accurate communication;
         a Cycle Accurate HDL model of an intellectual property (IP) block;
         a system level model of the IP block; and
         a switch coupled to the plurality of port interfaces, wherein the switch is selectively configured to communicate with the Cycle Accurate HDL model or the system level model.

2. The computing system of claim 1, wherein the system level simulation wrapper further comprises one or more translation layers coupled between the switch and the system level model of the IP block, for translating information between the plurality of port interfaces and the system level model of the IP block.

3. The computing system of claim 2, wherein the system level model of the IP block comprises a functional model with a functional interface.

4. The computing system of claim 3, wherein the one or more translation layers comprise:
   a system level interface layer for communication with the plurality of port interfaces;
   an intermediate level interface layer for communication with the system level interface layer;
   a pin accurate interface layer for communication with the intermediate level interface layer; and
   a transaction level modeling (TLM) interface layer for communication with the pin accurate interface layer, wherein the TLM interface layer is configured to receive information from and transmit information to the functional interface of the functional model.

5. The computing system of claim 2, wherein the system level model of the IP block comprises a transaction level model with a transaction level model port interface.

6. The computing system of claim 5, wherein the one or more translation layers comprise:
   a system level interface layer for communication with the plurality of port interfaces;
   an intermediate level interface layer for communication with the system level interface layer; and
   a pin accurate interface layer for communication with the intermediate level interface layer, wherein the pin accurate interface layer is configured to receive information from and transmit information to the transaction level model port interface of the transaction level model.

7. The computing system of claim 2, wherein the system level model of the IP block comprises a pin accurate model with a pin accurate model port interface.

8. The computing system of claim 7, wherein the one or more translation layers comprise:
   a system level interface layer for communication with the plurality of port interfaces; and
   an intermediate level interface layer for communication with the system level interface layer, wherein the intermediate level interface layer is configured to receive information from and transmit information to the pin accurate model port interface of the pin accurate model.

9. The computing system of claim 1, wherein the system level model or the Cycle Accurate HDL model is for simulating a system design.

10. The computing system of claim 9, wherein the Cycle Accurate HDL model or the system level model is configured for simulating the system design at a system level.

11. A computing system for simulating a system design of a hardware system, the computing system comprising:
    a processor; and
    memory storing the system design, wherein the system design comprises:
       a bus; and
       a system level simulation wrapper, comprising:
          a plurality of port interfaces configured to communicate with the bus;
          a Cycle Accurate HDL model of an intellectual property (IP) block;
          a system level model of the IP block; and
          a switch coupled to the plurality of port interfaces, wherein the switch is selectively configured to communicate with the Cycle Accurate HDL model or the system level model; and
       one or more additional Cycle Accurate HDL models coupled to the bus.

12. The computing system of claim 11, wherein the system level simulation wrapper further comprises one or more translation layers coupled between the switch and the system level model of the IP block, for translating information between the plurality of port interfaces and the system level model of the IP block.

13. The computing system of claim 12, wherein the system level model of the IP block comprises a functional model with a functional interface.

14. The computing system of claim 13, wherein the one or more translation layers comprise:
    a system level interface layer for communication with the plurality of port interfaces;
    an intermediate level interface layer for communication with the system level interface layer;
    a pin accurate interface layer for communication with the intermediate level interface layer; and
    a transaction level modeling (TLM) interface layer for communication with the pin accurate interface layer, wherein the TLM interface layer is configured to receive information from and transmit information to the functional interface of the functional model.

15. The computing system of claim 12, wherein the system level model of the IP block comprises a transaction level model with a transaction level model port interface.

16. The computing system of claim 15, wherein the one or more translation layers comprise:
    a system level interface layer for communication with the plurality of port interfaces;
    an intermediate level interface layer for communication with the system level interface layer; and
    a pin accurate interface layer for communication with the intermediate level interface layer, wherein the pin accurate interface layer is configured to receive information from and transmit information to the transaction level model port interface of the transaction level model.

17. The computing system of claim 12, wherein the system level model of the IP block comprises a pin accurate model with a pin accurate model port interface.

18. The computing system of claim 17, wherein the one or more translation layers comprise:
    a system level interface layer for communication with the plurality of port interfaces; and an intermediate level interface layer for communication with the system level interface layer, wherein the intermediate level interface layer is configured to receive information from and transmit information to the pin accurate model port interface of the pin accurate model.

19. The computing system of claim 11, wherein the Cycle Accurate HDL model or the system level model is for system design simulation.

20. The computing system of claim 11, wherein the system level model is configured to communicate with the one or more additional Cycle Accurate HDL models of the IP block.

\* \* \* \* \*